United States Patent
Wada et al.

(10) Patent No.: US 7,194,348 B2
(45) Date of Patent: Mar. 20, 2007

(54) HIGH ACCELERATION TIME SHIFT CONTROL APPARATUS AND CONTROL METHOD FOR VEHICLE

(75) Inventors: Masumi Wada, Toyota (JP); Yoshiharu Harada, Toyota (JP); Masayasu Mizobuchi, Aichi-gun (JP); Naoyuki Sakamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 616 days.

(21) Appl. No.: 10/748,145

(22) Filed: Dec. 31, 2003

(65) Prior Publication Data

US 2004/0153232 A1  Aug. 5, 2004

(30) Foreign Application Priority Data

Jan. 17, 2003 (JP) ............................. 2003-009521

(51) Int. Cl.
  *F16D 61/00* (2006.01)
  *G06F 19/00* (2006.01)
  *F16H 59/36* (2006.01)
  *F16H 61/08* (2006.01)

(52) U.S. Cl. ............................. 701/55; 701/51; 701/56; 701/64; 701/68; 477/143; 477/144; 477/34; 477/107

(58) Field of Classification Search ................. 701/55, 701/51, 56, 64, 68; 477/143–144, 34, 107
See application file for complete search history.

(56) References Cited

U.S. PATENT DOCUMENTS 4,484,553 A * 11/1984 Kobayashi et al. .... 123/339.15

(Continued)

FOREIGN PATENT DOCUMENTS

JP  2-97763  4/1990

(Continued)

OTHER PUBLICATIONS

S Nishida et al., Influence of motion signals on the perceived position . . . , Nature, v397, n6720, pp. 610-612, 1999 (from DialogClassic Web(TM) file 95, acc. No. 01289694 E99030200304).*

(Continued)

*Primary Examiner*—Cuong Nguyen
(74) *Attorney, Agent, or Firm*—Oblon, Spivak, McClelland, Maier & Neustadt, P.C.

(57) ABSTRACT

A high acceleration time shift control apparatus and method for a vehicle is provided. The high acceleration time shift control apparatus includes a transmission which achieves plural shift speeds whose gear ratios are different from each other; and a high acceleration time upshifting control device which changes a shift speed of the transmission to a higher speed based on a predetermined determination rotational speed such that an input rotational speed of the transmission substantially reaches a target maximum rotational speed when a request for high acceleration is made by a driver. The high acceleration time upshifting control device outputs an upshift command for performing an upshift when the determination rotational speed reaches a predetermined shift determination speed; calculates an actual ineffective time until shifting is actually started and the input rotational speed starts decreasing after the upshift command is output; computes a virtual maximum rotational speed, that is a maximum rotational speed when the input rotational speed changes at a reference rotational speed change rate, based on the input rotational speed when the upshift command is output, the ineffective time and the predetermined reference rotational speed change rate; and changes the shift determination speed such that the virtual maximum rotational speed comes close to the target maximum rotational speed and then performs learning.

12 Claims, 9 Drawing Sheets

U.S. PATENT DOCUMENTS

| | | | |
|---|---|---|---|
| 4,498,033 A * | 2/1985 | Aihara et al. | 318/261 |
| 4,517,949 A * | 5/1985 | Ito et al. | 123/674 |
| 4,905,545 A * | 3/1990 | Leising et al. | 477/133 |
| 4,982,620 A * | 1/1991 | Holbrook et al. | 74/731.1 |
| 5,119,695 A * | 6/1992 | Milunas et al. | 477/98 |
| 5,333,577 A * | 8/1994 | Shinojima | 123/90.15 |
| 5,631,999 A * | 5/1997 | Dinsmore | 388/805 |
| 5,758,631 A * | 6/1998 | Teraoka | 123/674 |
| 5,895,435 A * | 4/1999 | Ohta et al. | 701/59 |
| 5,911,647 A * | 6/1999 | Kozaki et al. | 477/143 |
| 6,184,641 B1 * | 2/2001 | Crimmins et al. | 318/466 |
| 6,185,171 B1 * | 2/2001 | Bassett et al. | 369/53.18 |
| 6,209,408 B1 * | 4/2001 | DeJonge et al. | 74/335 |
| 6,553,301 B1 * | 4/2003 | Chhaya et al. | 701/54 |
| 6,634,989 B2 * | 10/2003 | Yu | 477/143 |

FOREIGN PATENT DOCUMENTS

| | | |
|---|---|---|
| JP | 3-260455 | 11/1991 |
| JP | 5-14039 | 4/1993 |
| JP | 5-296332 | 11/1993 |
| JP | 10-89455 | 4/1998 |
| JP | 2002-327834 | 11/2002 |
| JP | 2001-304384 | 10/2006 |

OTHER PUBLICATIONS

Shou-Tao Li et al., Autonomous mobile robot control algorithm based on fuzzy behaviors in unknown environments, published in Jul. 2005, from DialogClassic Web(TM) file 8, acc. No. 07537845 E.I. No. EIP05319278118).*

Shou-Tao Li, Neuro/fuzzy behavior-based control of a mobile robot environments, Proceedings of 2004 Inter. Conf. of Learning and Cybernetics, printed in 2004 (from DialogClassic Web(tm) file 8 acc. No. 07097322 E.I. No. EIP04458446543).*

* cited by examiner

| POSITION | | CLUTCHES & BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

HIGH ACCELERATION TIME SHIFT CONTROL APPARATUS AND CONTROL METHOD FOR VEHICLE

INCORPORATION BY REFERENCE

The disclosure of Japanese Patent Application No. 2003-009521 filed on Jan. 17, 2003, including the specification, drawings and abstract is incorporated herein by reference in its entirety.

BACKGROUND OF THE INVENTION

1. Field of the Invention

The invention relates to a shift control apparatus and shift control method for a vehicle. More particularly, the invention relates to upshift control during high acceleration, that is, when a request for substantially maximum acceleration is made by a driver.

2. Description of the Related Art

A high acceleration time shift control apparatus for a vehicle is known which includes (a) a transmission that achieves plural shift speeds whose gear ratios are different from each other, and (b) high acceleration time upshifting means for changing the shift speed of the transmission to a higher speed based on a predetermined rotational speed for determination (hereinafter, referred to as a "determination rotational speed") such as a vehicle speed, such that an input rotational speed of the transmission substantially reaches a predetermined target maximum rotational speed when a request for high acceleration is made by a driver, for example, when an accelerator pedal operation amount is large. An example of the above-mentioned apparatus is disclosed in Japanese Patent Laid-Open Publication No. 10-089455. The high acceleration time upshifting means includes (c) shift determining means for outputting an upshift command for performing an upshift when the determination rotational speed reaches a predetermined speed at which it is determined that shifting can be performed (hereinafter, referred to as a "shift determination speed"), and (d) ineffective time calculating means for obtaining an actual ineffective time until shifting is actually started and the input rotational speed starts decreasing after the upshift command is output. The high acceleration time upshifting means (e) successively calculates a rate of change of the input rotational speed of the transmission during actual acceleration, and sets the shift determination speed such that the input rotational speed reaches the target maximum rotational speed in the ineffective time when the input rotational speed changes at the rate of change.

However, the shift determination speed is set based on the rate of change of the input rotational speed during actual acceleration, on the precondition that the input rotational speed changes at the same rate of change even after the upshift command is output. Therefore, a change (decrease) in the rate of change, for example, due to a torque phase is not reflected. Also, the rate of change (hereinafter, referred to as the "change rate") changes due to a disturbance such as a change in a road inclination. Accordingly, it is not always possible to perform shifting at a rotational speed substantially equal to the target maximum rotational speed with high accuracy. Also, there is another problem that, since the shift determination speed is set according to the actual change rate each time upshifting is performed during high acceleration, the shift determination speed changes each time upshifting is performed, and the control become unstable.

SUMMARY OF THE INVENTION

The invention is made in the light of the above-mentioned circumstance. It is an object of the invention to set a shift determination speed in consideration of a change in a change rate of an input rotational speed due to a torque phase or the like after an upshift command is output, and to stably perform shifting at a rotational speed substantially equal to a target maximum rotational speed without being affected by an individual difference in hardware of a transmission.

As an aspect of the invention, there is provided a high acceleration time shift control apparatus for a vehicle including (a) a transmission which achieves plural shift speeds whose gear ratios are different from each other, and (b) high acceleration time upshifting device which changes a shift speed of the transmission to a higher speed based on a predetermined determination rotational speed such that an input rotational speed of the transmission substantially reaches a target maximum rotational speed when a request for high acceleration is made by a driver. (c) The high acceleration time upshifting device includes (c-1) a shift determination device which outputs an upshift command for performing an upshift when the determination rotational speed reaches the predetermined shift determination speed, (c-2) an ineffective time calculating device which obtains an actual ineffective time until shifting is actually started and the input rotational speed starts decreasing after the upshift command is output, (c-3) a virtual maximum rotational speed computing device which obtains a virtual maximum rotational speed, that is a maximum rotational speed when the input rotational speed changes at a reference rotational speed change rate, based on the input rotational speed when the upshift command is output, the ineffective time and the predetermined reference rotational speed change rate, and (c-4) a learning device which changes the shift determination speed such that the virtual maximum rotational speed comes close to the target maximum rotational speed.

According to another aspect of the invention, there is provided a high acceleration time shift control method for a vehicle which includes a transmission that achieves plural shift speeds whose gear ratios are different from each other. The control method includes the following steps of: changing a shift speed of the transmission to a higher speed based on a predetermined determination rotational speed such that an input rotational speed of the transmission substantially reaches a target maximum rotational speed when a request for high acceleration is made by a driver; outputting an upshift command for upshifting when the determination rotational speed reaches a predetermined shift determination speed; calculating an actual ineffective time until shifting is actually started and the input rotational speed starts decreasing after the upshift command is output; computing a virtual maximum rotational speed, that is a maximum rotational speed when the input rotational speed changes at a reference rotational speed change rate, based on an input rotational speed when the upshift command is output, the ineffective time and the predetermined reference rotational speed change rate; and changing the shift determination speed such that the virtual maximum rotational speed comes close to the target maximum rotational speed and performing learning.

In the above-mentioned high acceleration time shift control apparatus and shift control method for a vehicle, the virtual maximum rotational speed, which is the maximum rotational speed when the input rotational speed changes at the reference rotational speed change rate, is obtained based on the input rotational speed when the upshift command is output, the actual ineffective time until shifting is actually started and the input rotational speed starts decreasing after the upshift command is output, and the predetermined reference rotational speed change rate, and the shift determination speed is changed such that the virtual maximum rotational speed comes close to the target maximum rotational speed. Therefore, by setting the reference rotational speed change rate in consideration of the change in the change rate of the input rotational speed due to the torque phase or the like after the upshift command is output, it is possible to perform shifting at a speed substantially equal to the target maximum rotational speed with high accuracy. Also, since the actual ineffective time is obtained, the virtual maximum rotational speed is calculated and then the shift determination speed is changed, the shift determination speed converges on a substantially constant value according to the individual difference in the hardware of the transmission which affects the ineffective time. As long as the input rotational speed changes at a change rate substantially the same as the predetermined reference rotational speed change rate, shifting can be stably performed at a speed substantially equal to the target maximum rotational speed regardless of the individual difference in the hardware of the transmission.

BRIEF DESCRIPTION OF THE DRAWINGS

The above-mentioned embodiment and other objects, advantages, technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

As the above-mentioned transmission, it is preferable to use a transmission which switches plural friction devices between engaged state and disengaged state so as to achieve plural shift speeds whose gear ratios are different from each other, such as a transmission of a planetary gear type which engages/disengages plural rotational elements of a planetary gear set with/from the friction devices so as to achieve plural forward shift speeds. The invention can be applied to a transmission in which there is a delay time (ineffective time) until shifting is actually performed after an upshift command is output, and an input rotational speed increases during the delay time. The shift determining means is configured so as to output an upshift command for switching, for example, the friction devices between the engaged state and the disengaged state.

As the above-mentioned friction device, for example, a hydraulic friction device which is engaged by a hydraulic actuator is used. The delay time, until a hydraulic circuit is switched according to the upshift command such that hydraulic pressure is supplied to the hydraulic actuator, and a piston is moved such that the friction device generates engagement force (torque) after the upshift command is output, corresponds to the ineffective time. It is inevitable that the delay time (ineffective time) varies depending on the individual difference in the hardware. The effect of the individual difference is eliminated by the learning means. When the viscosity of operating oil changes, the delay time also changes. Therefore, it is desirable to learn a temperature or the like which affects the viscosity as a parameter.

The above-mentioned transmission is configured such that plural forward speeds are automatically changed using the operation state such as a vehicle speed and a throttle valve opening amount as a parameter. Only when a request for high acceleration is made by a driver, upshift control by the high acceleration time upshifting means is performed.

It is desirable that a hydraulic power transmission device, such as a torque converter and a fluid coupling, which transmits power through fluid be provided between the transmission and a driving power source for running. As the driving power source for running, for example, an engine or an electric motor is used. However, the invention can be applied to a hybrid vehicle which includes both the engine and the electric motor.

The degree of acceleration requested by the driver can be determined based on an operation amount of an acceleration operation member such as an accelerator pedal, or a throttle valve opening amount which corresponds to the operation amount. The high acceleration time upshifting means is configured so as to perform control during high acceleration, for example, when the accelerator pedal operation amount is equal to or larger than, for example, 85%.

As the determination rotational speed at which the high acceleration time upshifting means determines whether upshifting can be performed, the output rotational speed of the transmission or the vehicle speed is preferably used. However, other rotational speeds such as the input rotational speed can be used.

Since the reference rotational speed change rate varies depending on the gear ratio of the transmission, it is preferable to set the reference rotational speed change rate for each type of upshifting. Also, the reference rotational speed change rate is set, for example, on the precondition that the vehicle is running on a flatland when a request for high acceleration is made. In order to prevent the input rotational speed and also the rotational speed of the driving power source from excessively increasing on a downhill slope or the like, it is preferable to set the reference rotational speed change rate to a value which is higher than a normal value in order to secure a certain level of safety. It is also preferable to set the target maximum rotational speed to a value which is lower than the normal value in order to secure a certain level of safety.

As will be described later in detail, when a virtual maximum rotational speed is computed, the virtual maximum rotational speed can be obtained, for example, by multiplying the reference rotational speed change rate by the ineffective time, and adding the result of multiplication to the input rotational speed when the upshift command is output.

Also, when learning is performed, for example, the shift determination speed is increased/decreased in increments/decrements of a predetermined value, or the shift determination speed is increased/decreased in increments/decrements of a value obtained by multiplying a deviation between the target maximum rotational speed and the virtual maximum rotational speed by a predetermined coefficient, such that the virtual maximum rotational speed comes close to the target maximum rotational speed. When the virtual maximum rotational speed or the actual input rotational speed exceeds a predetermined guar value, and excessively increases, it is preferable to promptly decrease the shift determination speed, for example, by increasing the coefficient, in order to decrease the maximum rotational speed promptly.

Figure 1:
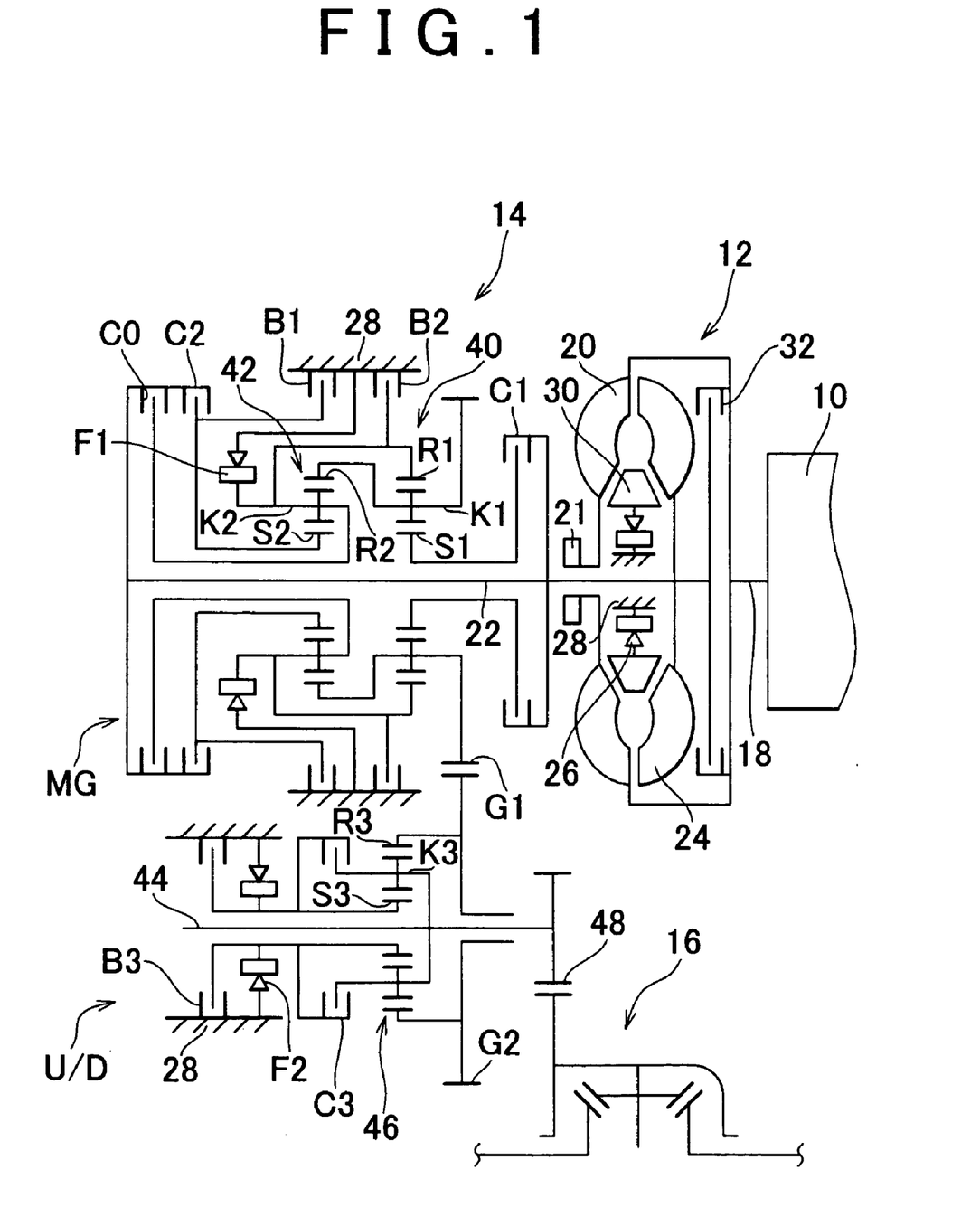
FIG. 1 is a view schematically showing a drive unit for a vehicle, to which an embodiment of the invention is applied.

Hereafter, an embodiment of the invention will be described in detail with reference to accompanying drawings. FIG. 1 is a skeleton view of a transverse-mounted drive unit for a vehicle such as a FF (front engine, front drive) vehicle. Output from an engine 10, such as a gasoline engine which generates power due to fuel combustion, is transmitted to driven wheels (front wheels), not shown, via a torque converter 12, an automatic transmission 14, and a differential gear unit 16. The torque converter 12 is a hydraulic power transmission device which transmits power through fluid. The torque converter 12 includes a pump impeller 20 which is connected to a crankshaft 18 of the engine 10, a turbine runner 24 which is connected to an input shaft 22 of the automatic transmission 14, a stator 30 which is fixed to a housing 28, that is a non-rotatable member, via a one-way clutch 26, and a lockup clutch 32 which directly connects the crankshaft 18 with the input shaft 22 via a damper, not shown. A mechanical oil pump 21 such as a gear pump is connected to the pump impeller 20. This oil pump 21 is driven together with the pump impeller 20 by the engine 10 so as to generate hydraulic pressure used for shifting, lubrication and the like. The engine 10 corresponds to a driving power source for running.

The lockup clutch 32 is a hydraulic friction clutch which is frictionally engaged due to a pressure difference ΔP between hydraulic pressure in an engagement side oil chamber and hydraulic pressure in disengagement side oil chamber. When the lockup clutch 32 is fully engaged, the pump impeller 20 and the turbine runner 24 are rotated integrally with each other. Also, since the pressure difference ΔP, that is, engagement torque, is controlled in a feedback manner such that the lock up clutch 32 is engaged in a predetermined slip state, the turbine runner 24 is rotated in accordance with rotation of the pump impeller 20 in a predetermined slip amount of, for example, 50 rpm, during driving. Meanwhile, during reverse input, the pump impeller 20 can be rotated in accordance with rotation of the turbine runner 24 in a predetermined slip amount of, for example, −50 rpm.

The automatic transmission 14 includes a first planetary gearset 40, a second planetary gearset 42, and a third planetary gearset 46, all of which are of the single pinion type, and an output gear 48. The first planetary gearset 40 and second planetary gearset 42 are both provided on the same axis as the input shaft 22, with a carrier of the first gearset 40 coupled to a ring gear of the second planetary gearset 42 and a carrier of the second planetary gearset 42 coupled to a ring gear of the first planetary gearset 40, such that the first planetary gearset 40 and second planetary gearset 42 together form a so-called CR-CR (carrier-ring-carrier-ring) coupled planetary mechanism. The third planetary gearset 46 is provided on the same axis as a countershaft 44 which is parallel with the input shaft 22. The output gear 48 is fixed to one end of the countershaft 44 and is meshed with the differential gear unit 16. The structural elements of each of the first planetary gearset 40, the second planetary gearset 42, and the third planetary gearset 46, i.e., a sun gear, a ring gear, and a carrier that rotatably support planetary gears which mesh with the sun gear and ring gear, can either be selectively coupled together by four clutches C0, C1, C2, and C3, or selectively coupled to the housing 28, which is a non-rotatable member, by three brakes B1, B2, and B3. Further, two one-way clutches F1 and F2 enable a carrier K2 and a sun gear S3, respectively, to either rotate in a given direction with respect to the housing 28, or engage with the housing 28. Because the differential gear unit 16 is symmetrical with respect to the axis of the drive axles, the bottom half thereof will be omitted.

The set of the first planetary gearset 40 and second planetary gearset 42 on the same axis as the input shaft 22, together with the clutches C0, C1, C2, the brakes B1 and B2, and the one-way clutch F1 make up a primary transmitting portion MG capable of four forward speeds and one reverse speed. The third planetary gearset 46 on the same axis as the countershaft 44, together with the clutch C3, the brake B3, and the one-way clutch F2 make up a secondary transmitting portion, i.e., an under drive portion U/D. In the primary transmitting portion MG, the input shaft 22 is coupled to i) the carrier K2 of the second planetary gearset 42 via the clutch C0, ii) a sun gear S1 of the first planetary gearset 40 via the clutch C1, and iii) a sun gear S2 of the second planetary gearset 42 via the clutch C2. A ring gear R1 of the first planetary gearset 40 is connected to the carrier K2 of the second planetary gearset 42, and a ring gear R2 of the second planetary gearset 42 is connected to a carrier K1 of the first planetary gearset 40. The sun gear S2 of the second planetary gearset 42 is coupled to the housing 28 via the brake B1. The ring gear R1 of the first planetary gearset 40 is coupled to the housing 28 via the brake B2. The one-way clutch F1 is provided between the carrier K2 of the second planetary gearset 42 and the housing 28. A first counter gear G1, with is fixed to the carrier K1 of the first planetary gearset 40, is in mesh with a second counter gear G2, which is fixed to a ring gear R3 of the third planetary gearset 46. In the under drive portion U/D, a carrier K3 and the sun gear S3 of the third planetary gearset 46 are coupled together via the clutch C3. Also, in the under driver portion U/D, the brake B3 and the one-way clutch F2 are provided in parallel between the sun gear S3 and the housing 28.

Figure 2:
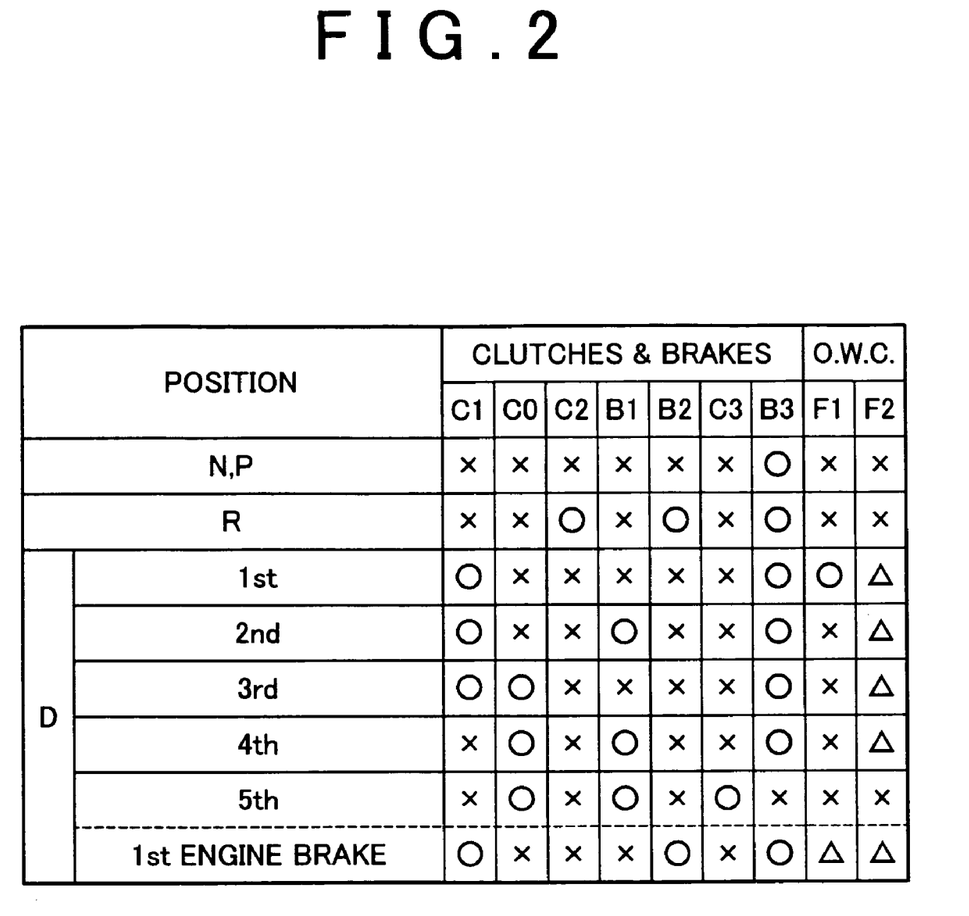
FIG. 2 is a table showing combinations of operations of plural hydraulic friction devices, and shift speeds which are achieved by the combinations.

The clutches C0, C1, C2, and C3 and the brakes B1, B2, B3 (hereinafter, simply referred to as "clutches C2 and "brakes B, respectively, when not specified further) are hydraulic friction devices, the clutches C being, for example, multi-disc clutches and the brakes B being, for example, band brakes which are controlled by hydraulic actuators. These clutches C and brakes B are switched between an applied state and a released state, as shown in FIG. 2, for example, by switching linear solenoids SL1, SL2, SL3, and SLT and solenoids DSL, S4 and SR of a hydraulic pressure control circuit 98 (see FIG. 3) between an energized state and a de-energized state, or by switching a hydraulic circuit using a manual valve, not shown. Each speed, i.e., five forward speeds, one reverse speed, and a neutral speed, is achieved according to a position of a shift lever 72 (see FIG. 3). The denotations "1st" to "5th" in FIG. 2 denote the first forward speed to the fifth forward speed, respectively. A gear ratio γ(=input speed $N_{in}$/output speed $N_{out}$) becomes smaller from the first speed "1st" to the fifth speed "5th". In the figure, a single circle indicates an applied state of the clutches C and brakes B. An "X" indicates a released state of the clutches C, brakes B and one-way clutches F. A triangle indicates an applied state of the clutches C, brakes B, and one-way clutches F which is not related to power transmission. The shift lever 72 is operated in a shift pattern which indicates a park position "p", a reverse drive position "R", a neutral position "N", and forward drive positions "D", "4", "3", "2", and "L", as shown in FIG. 4, for example. When the shift lever 72 is in the "P" or the "N" position, the transmission is in a neutral speed, i.e., a non-driving speed in which the transmission of power to the wheels is interrupted. When the shift lever 72 is in the "P" position, the driven wheels are mechanically prevented from rotating by a mechanical parking brake, not shown.

In FIG. 2, in each of the second speed to the fifth speed, the engine brake is applied by transmitting the reverse input from the driven wheel to the engine 10. Shifting among these shift speeds is achieved by so-called clutch-to-clutch shifting for disengaging one of the two friction devices while engaging the other. For example, 3→4 shifting or 4→3 shifting between the third speed and the fourth speed is achieved by disengaging the clutch C1 and applying the brake B1, or by releasing the brake B1 and engaging the clutch C1. Even in the first speed, the engine brake is applied by applying the brake B2. In this case, shifting between the first speed and the second speed is performed by clutch-to-clutch shifting.

Figure 3:
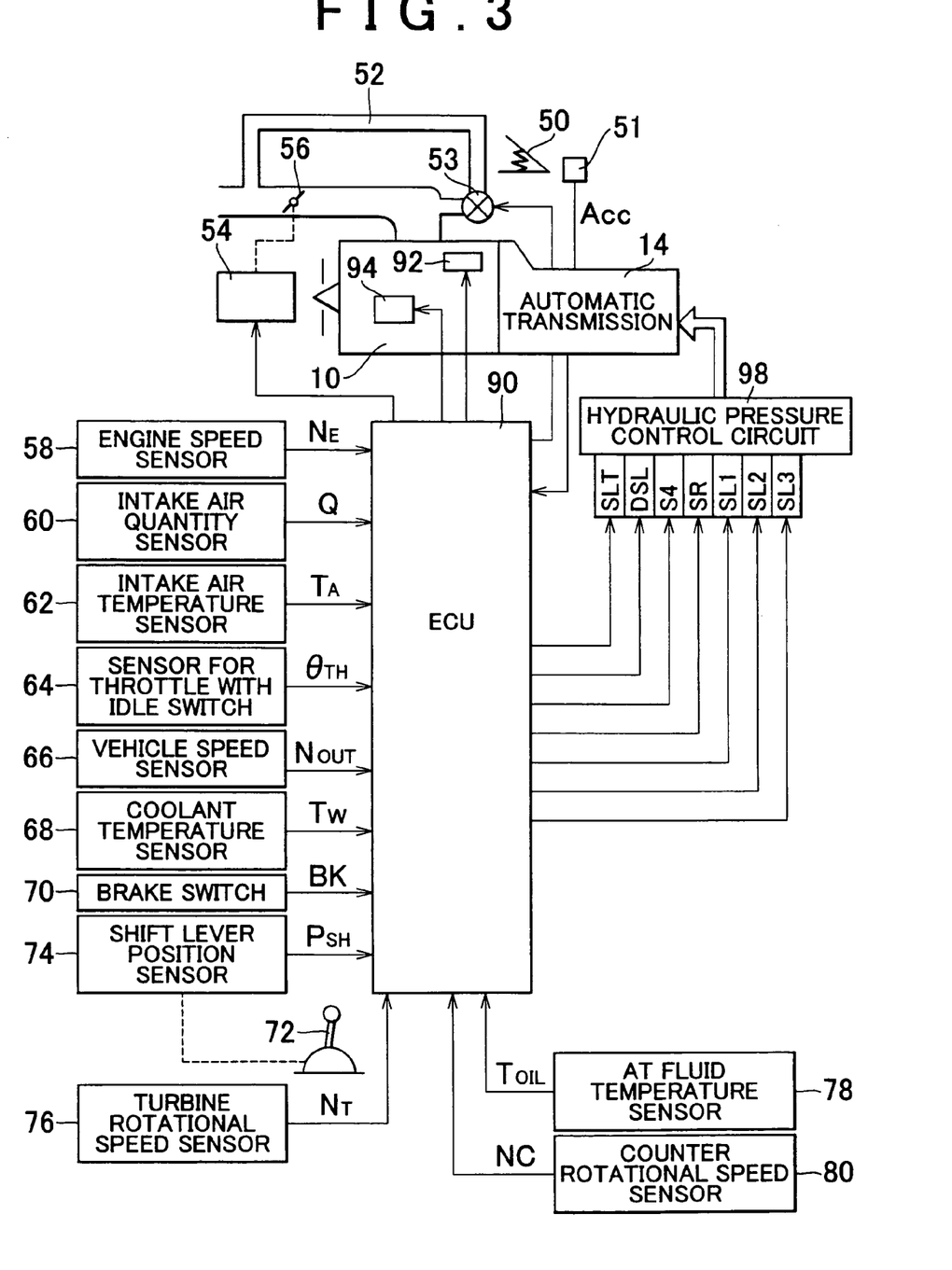
FIG. 3 is a block diagram showing a main portion of a control system included in the drive unit for a vehicle in FIG. 1.
Figure 4:
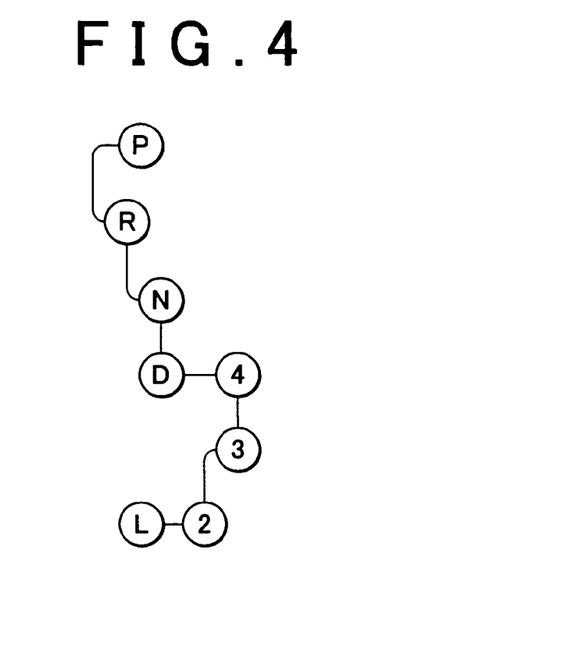
FIG. 4 is a view showing shift positions for a shift lever in FIG. 3.

FIG. 3 is a block diagram illustrating a control system provided in a vehicle, which controls the engine 10 and automatic transmission 14 and the like shown in FIG. 1. According to this control system, the operation amount (accelerator opening amount) $A_{cc}$ of an accelerator pedal 50 is detected by an accelerator pedal operation amount sensor 51. This accelerator pedal 50 corresponds to an accelerator operating member and can be depressed to a large degree depending on the amount of output required by a driver. The accelerator pedal operation amount $A_{cc}$ corresponds to the amount of required output. In intake piping of the engine 10, there is provided an electronic throttle valve 56 whose opening amount is made to an opening amount $\theta_{TH}$ corresponding to the accelerator pedal operation amount $A_{cc}$ by a throttle actuator 54. Also, in a bypass passage 52 which bypasses the electronic throttle valve 56 is provided an ISC (idle speed control) valve 53 that controls the intake air quantity when the electronic throttle valve 56 is fully closed in order to control an idle speed $NE_{IDL}$ of the engine 10. In addition, other sensors and switches are also provided, such as an engine speed sensor 58 for detecting an engine speed NE of the engine 10, an intake air quantity sensor 60 for detecting an intake air quantity Q of the engine 10, an intake air temperature sensor 62 for detecting a temperature $T_A$ of the intake air, a sensor 64 for a throttle with an idle switch, for detecting whether the electronic throttle valve 56 is fully closed (i.e., whether the engine 10 is in an idle state) as well as for detecting the opening amount $\theta_{TH}$ of that electronic throttle valve 56, an output rotational speed N sensor 66 for detecting an output rotational speed $N_{OUT}$ (corresponding to a vehicle speed V), which is the rotational speed of the countershaft 44, a coolant temperature sensor 68 for detecting a coolant temperature $T_W$ of the engine 10, a brake switch 70 for detecting whether a foot brake is being operated, a shift position sensor 74 for detecting a shift position (i.e., an operating position) $P_{SH}$ of the shift lever 72, a turbine rotational speed sensor 76 for detecting a turbine rotational speed NT (=rotational speed (input rotational speed) $N_{IN}$ of the input shaft 22), an AT oil temperature sensor 78 for detecting an AT oil temperature $T_{OIL}$, which is the temperature of the operating oil within the hydraulic pressure control circuit 98, and a counter rotational speed sensor 80 for detecting a rotational speed NC of the first counter gear G1. Signals from these sensors indicative of the engine speed NE, intake air quantity Q, intake air temperature $T_A$, throttle valve opening amount $\theta_{TH}$ (output rotational speed $N_{OUT}$), engine coolant temperature $T_W$, a brake operation state BK, a shift position $P_{SH}$ of the shift lever 72, turbine rotation speed NT, AT oil temperature $T_{OIL}$, counter rotational speed NC, and the like are supplied to an electronic control unit (ECU) 90.

Figure 5:
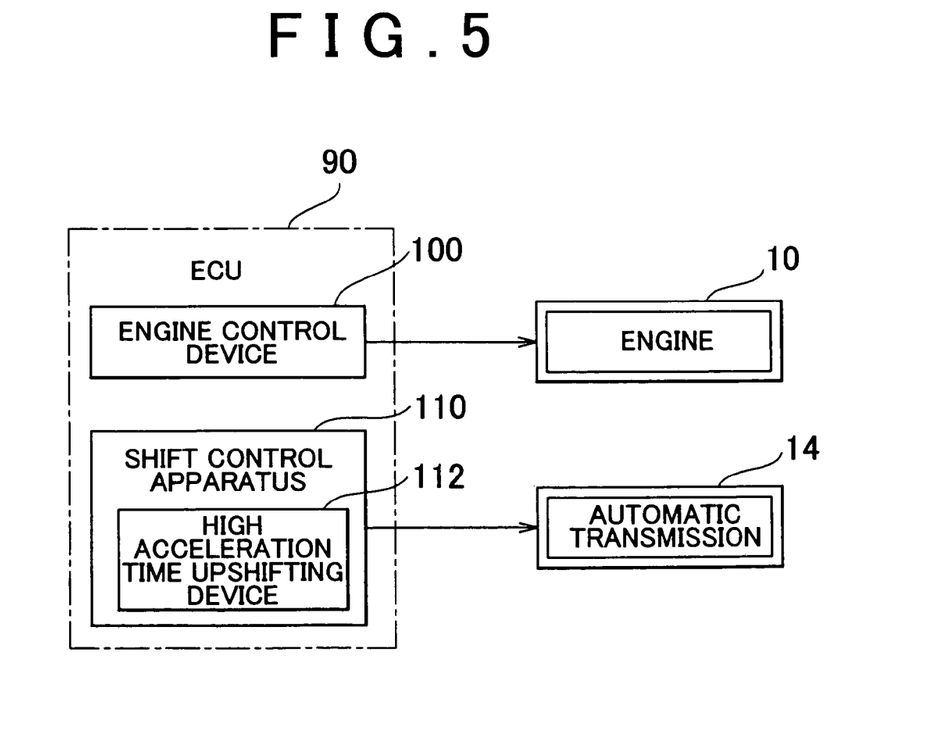
FIG. 5 is a block diagram showing a main function of an electronic control unit in FIG. 3.
Figure 6:
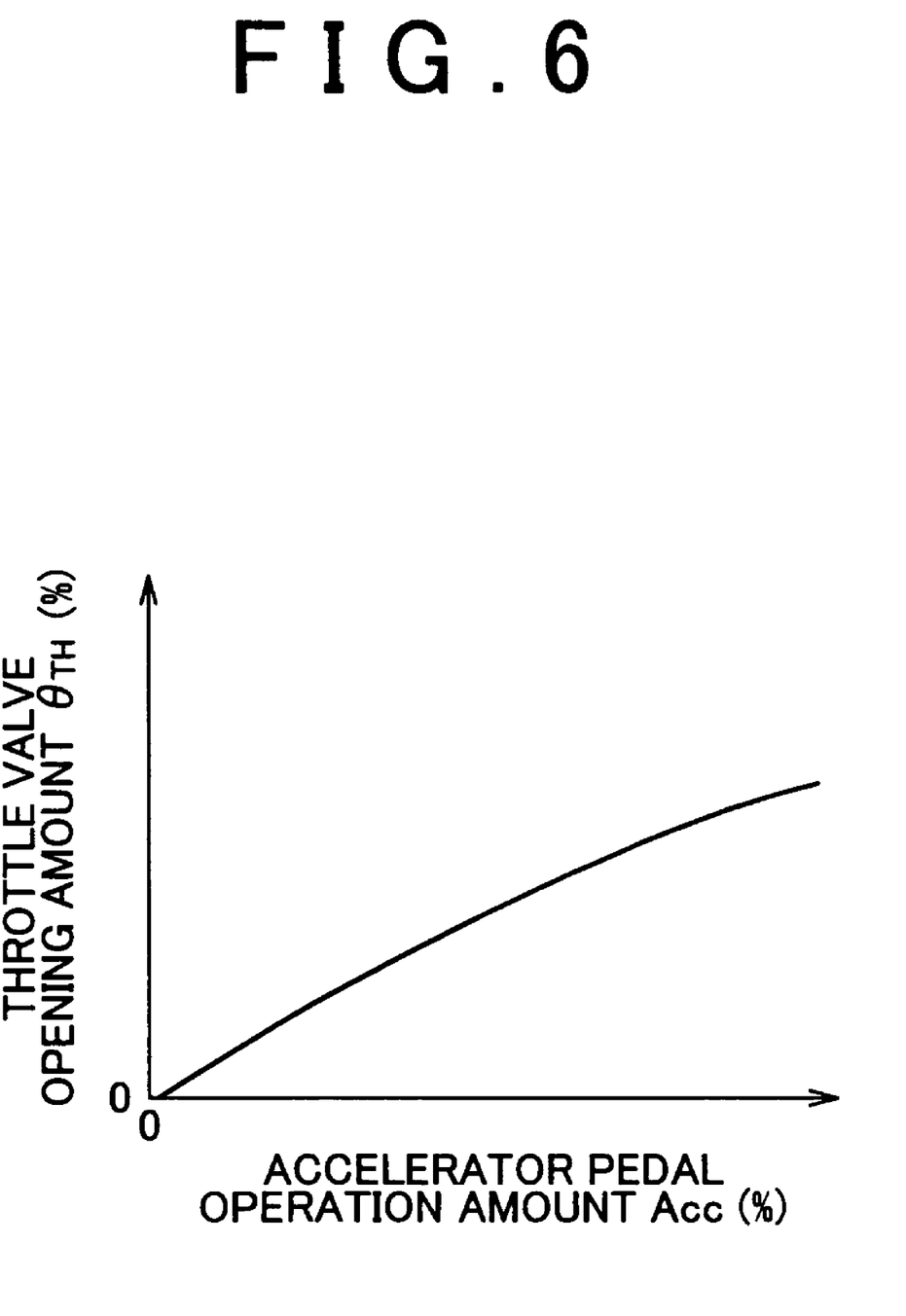
FIG. 6 is a graph showing a relationship between an opening amount of an electronic throttle valve controlled by an engine control device in FIG. 5, and an accelerator pedal operation amount.

The ECU 90 includes a microcomputer that has a CPU, RAM, ROM, and an input/output interface and the like. The CPU controls the output of the engine 10, the shifting of the automatic transmission 14, the slip control of the lockup clutch 32 and the like by processing signals according to a program stored in the ROM beforehand while using the temporary storage function of the RAM. When necessary, the CPU may be configured such that a portion thereof for engine control is separate from a portion thereof for shift control. FIG. 5 is a block diagram showing a main function performed by the ECU 90 through signal processing. The ECU 90 includes an engine control device 100 and a shift control apparatus 110. The shift control apparatus 110 includes a high acceleration time upshifting device 112.

The engine control device 100 basically performs output control of the engine 10. The engine control device 100 controls opening/closing of the electronic throttle valve 56 using the actuator 54, as well as controlling a fuel injection device 92 for controlling the fuel injection quantity, an ignition device 94 such as an igniter for controlling the ignition timing, and the ISC valve 53 for controlling the idling speed. In the control of the electronic throttle valve 56, for example, the throttle actuator 54 is driven based on the actual accelerator pedal operation amount $A_{cc}$ according to the relationship between the accelerator pedal operation amount $A_{cc}$ and the throttle valve opening amount $\theta_{TH}$, shown in FIG. 5, and the throttle valve opening amount $\theta_{TH}$ is increased with an increase in the accelerator pedal operation amount $A_{cc}$.

Figure 7:
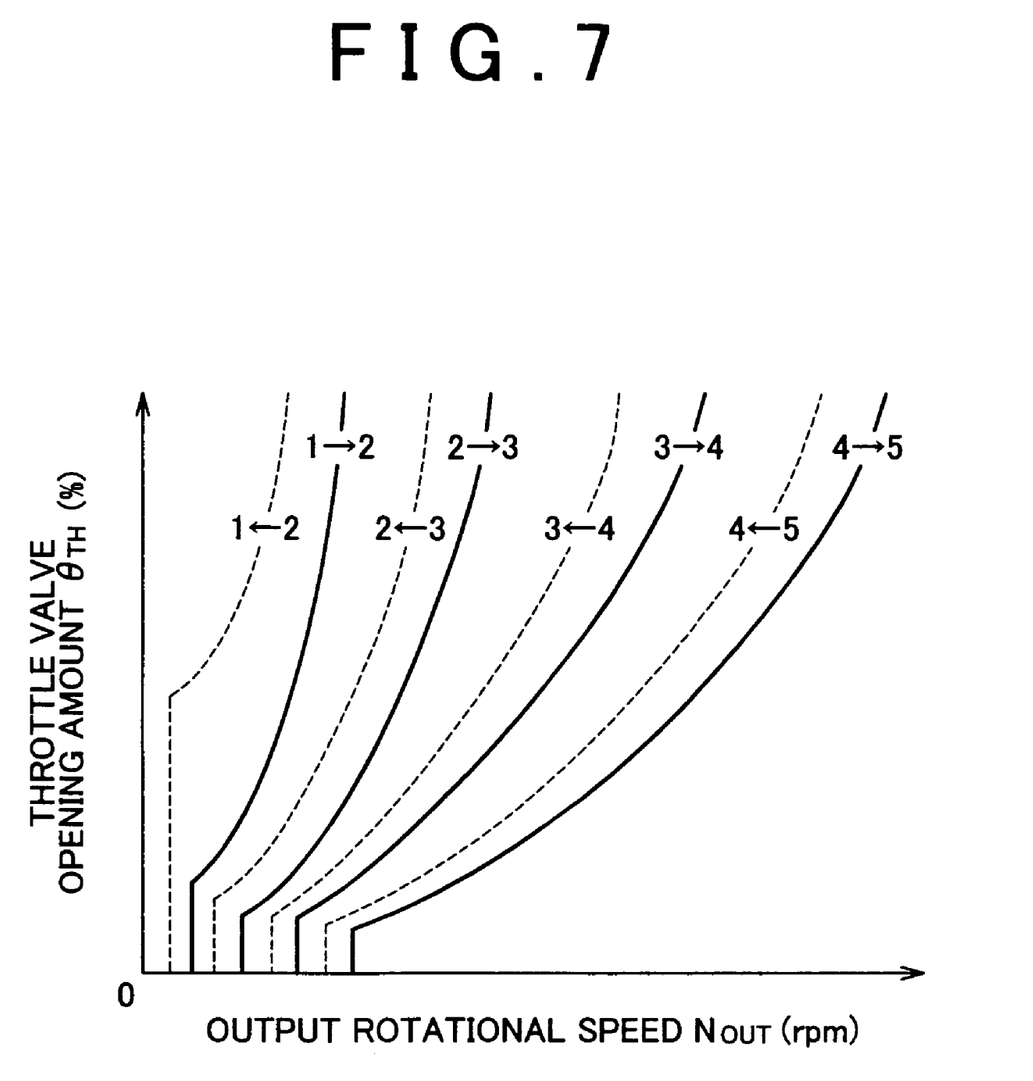
FIG. 7 is a graph showing an example of a shift map used for automatically changing a shift speed of an automatic transmission by a shift control apparatus based on an operation state.

The shift control apparatus 110 performs shift control of the automatic transmission 14 according to the shift position $P_{SH}$ of the shift lever 72. For example, when the shift lever 72 is at the "D" position, shift control is performed using all the forward shift speeds, that are the first speed "1st" to the fifth speed "5th". In the shift control, the shift speed of the automatic transmission 14 is decided based on the actual throttle valve opening amount $\theta_{TH}$ and the output rotational speed $N_{out}$ according to, for example, the shift map (shifting condition) shown in FIG. 7, which is stored in the ECU in advance. Then, the solenoids DSL, S4, and SR of the hydraulic control circuit 98 are switched between ON (energized state) and OFF (de-energized state), or the energized/de-energized states of the linear solenoids SL1, SL2, SL3, and SLT are continuously changed through duty control or the like, such that the decided shift speed is achieved. The linear solenoid SL1, SL2, and SL3 can directly control the hydraulic pressure at which the brake B1, the clutch C0, and C1 are applied, respectively. The linear solenoids SL1, SL2, and SL3 adjust the hydraulic pressures such that a shift shock such as a change in the driving power is not generated, or durability of the friction member is not impaired. In FIG. 7, a solid line is an upshift line, and a dashed line is a downshift line. As the output rotational speed $N_{OUT}$ decreases or the throttle valve opening amount $\theta_{TH}$ increases, shift speed is changed to a lower speed where the gear ratio γ is large. Reference numerals "1" to "5" in the figure signify the first speed "1 st" to the fifth speed "5th", respectively.

Figure 8:
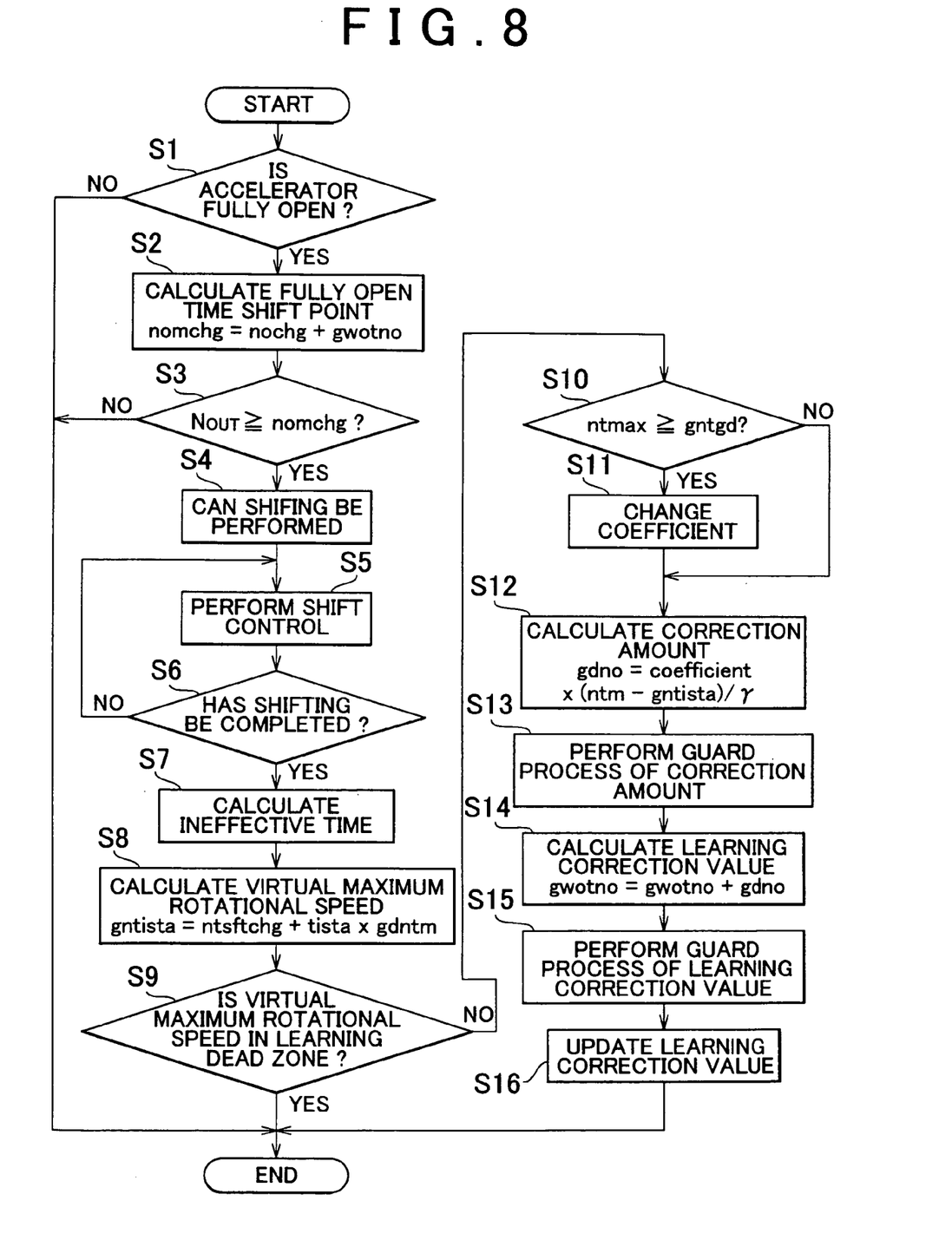
FIG. 8 is a flowchart for describing a concrete process performed by a high acceleration time upshifting device in FIG. 5.
Figure 9:
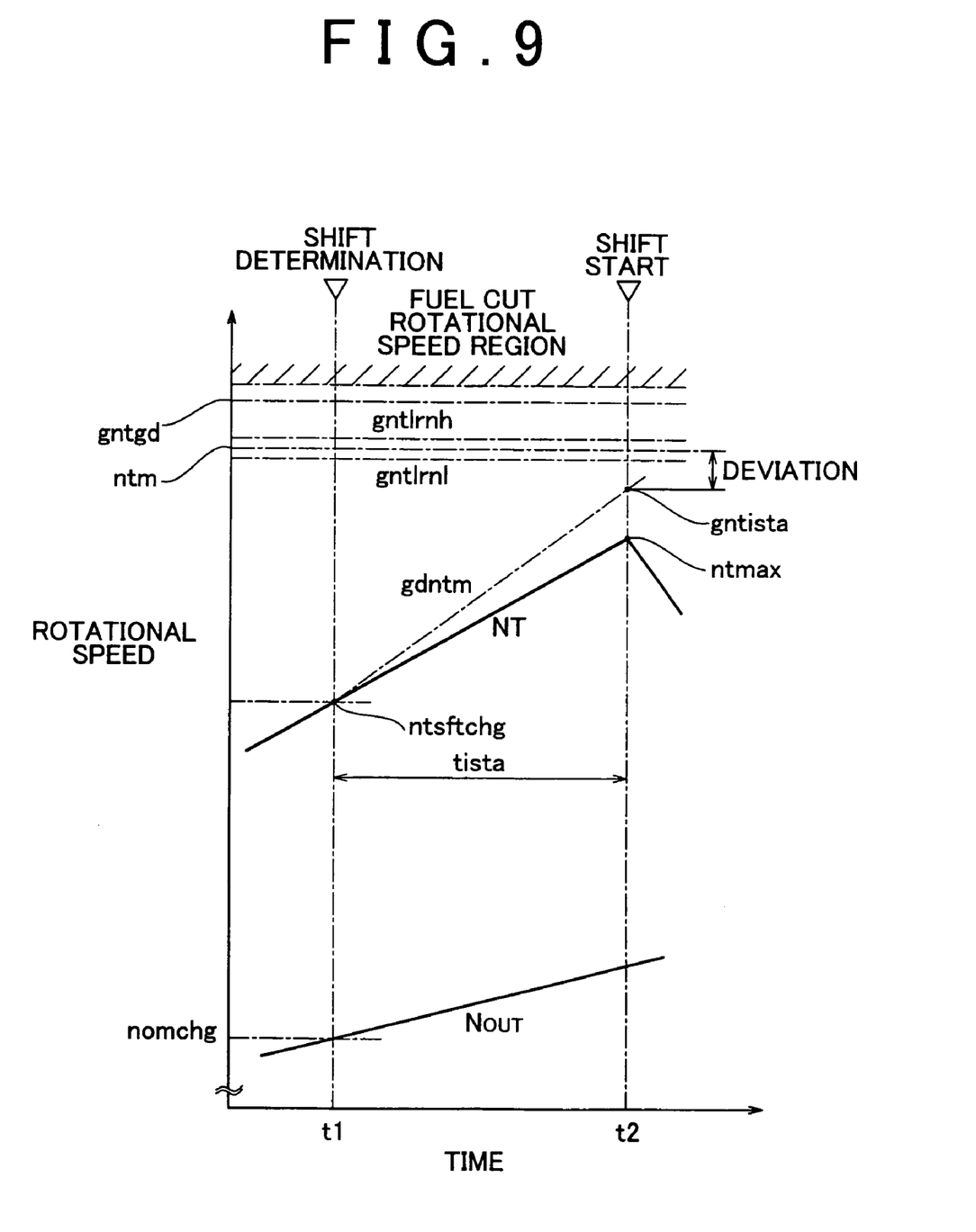
FIG. 9 is an example of a time chart for describing various parameters used in rotational speed change and learning control when upshift control is performed according to the flowchart in FIG. 8.

The shift control apparatus 110 includes the high acceleration time upshifting device 112 which performs upshift control based on the output rotational speed $N_{OUT}$, during high acceleration, that is, when the request for high acceleration is made by the driver, such that the turbine rotational speed NT, that is the input rotational speed of the automatic transmission 14, substantially reaches a predetermined target maximum rotational speed ntm, in addition to the shift map in FIG. 7. FIG. 8 is a flowchart showing a concrete process performed by the high acceleration time upshifting device 112. In steps S2 to S4, a determination for shifting is made. In step S5, shifting is performed. In step S7, an ineffective time is calculated. In step S8, the virtual maximum rotational speed is computed. In steps S9 to S16, learning is performed. FIG. 9 is an example of a time chart when upshifting is performed according to the flowchart in FIG. 8.

In step S1 in FIG. 8, it is determined whether the accelerator pedal is fully open, that is, whether the accelerator pedal operation amount $A_{cc}$ is, for example, equal to or larger than 85% due to driver's request for high acceleration. When it is determined that high acceleration is requested, a fully open time shift point nomchg is calculated in step S2. The fully open time shift point nomchg is a shift determination speed used for determining whether upshifting can be performed. In the embodiment, the output rotational speed $N_{OUT}$ is used as the determination rotational speed. When the output rotational speed $N_{OUT}$ reaches the fully open time shift point nochg, determination for upshifting is made. The fully open time shift point nomchg is obtained by adding a learning correction value gwotno to a predetermined reference shift point nomchg. These reference shift points nomchgs and the learning correction value gwotno are stored in a storage device such as RAM for each type of upshifting. In step S3, it is determined whether the actual output rotational speed $N_{OUT}$ is equal to or higher than the fully open time shift point nomchg. When it is determined that the actual output rotational speed $N_{OUT}$ is equal to or higher than the fully open time shift point nomchg, step S4 is performed so as to output the upshift command. In step S5, the solenoids DSL, S4, and SR of the hydraulic pressure control circuit 98 are switched between the ON state and the OFF state, and the clutches C and the brakes B are switched between the applied state and the released state, according to the upshift command. Also, through duty control of the linear solenoids SL1, SL2, SL3, or SLT, hydraulic pressures thereof are continuously controlled according to a predetermined change pattern or the like, and upshifting is performed as promptly as possible while a shift shock is suppressed.

There is a delay in a response until the pistons of the hydraulic actuators of the clutches C and the brakes B actually move so as to press the friction member and generate engagement force. Therefore, there is a considerable delay time until the inertia phase starts at time t2 when the turbine rotational speed NT actually starts decreasing after the upshift command is output at time t1 in FIG. 9. During the delay time, the turbine rotational speed NT continues to increase. It is inevitable that the delay time varies depending on the individual difference in the hardware of the automatic transmission 14, such as characteristics of the clutches C, the brakes B and the solenoid valves. A rotational speed ntsftchg in FIG. 9 is the actual turbine rotational speed NT when the upshift command is output at time t1. A rotating speed ntmax is the actual turbine rotational speed NT when the inertia phase is started at time t2, and is the maximum value of the turbine rotational speed NT during upshifting.

In step S6, it is determined whether upshifting has been completed by determining, for example, whether a value obtained by multiplying the gear ratio γ of the shift speed after upshifting by the output rotational speed $N_{OUT}$ is equal to the turbine rotational speed NT. When it is determined that upshifting has been completed, step S7 and the following steps are performed. In step S7, the delay time until the inertia phase is started after the upshift command is output, that is, a time (t2–t1) is obtained as an ineffective time tista. In step S8, a virtual maximum rotational speed gntista is calculated according to the following equation (1) using the turbine rotational speed ntsftchg when the upshift command is output, the ineffective time tista, and a predetermined reference rotational speed change rate gdntm.

$$gntista = ntsftchg + (tista \times gdntm) \qquad (1)$$

The virtual maximum rotational speed gntista is the maximum rotational speed when the turbine rotational speed NT changes at the predetermined reference rotational speed change rate gdntm. The high acceleration time upshifting device 112 performs shift control such that the virtual maximum rotational speed gntista substantially reaches the target maximum rotational speed ntm. The target maximum rotational speed ntm is the highest rotational speed in the range in which the engine 10 does not overrun. Thus, running during high acceleration is possible. Also, the reference rotational speed change rate gdntm is a change rate of the turbine rotational speed NT after the upshift command is output. The reference rotational speed change rate gdntm is set to a constant value for each type of upshifting in consideration of the rotational speed change due to the torque phase or the like, on the assumption that the vehicle is running on a flatland at the high acceleration, that is, with the accelerator pedal fully opened (100%). In order to prevent the turbine rotational speed NT and also the engine rotational speed NE from excessively increasing on a downhill slope or the like, the reference rotational speed change rate gdntm is set to a value which is higher than a normal value in order to secure a certain level of safety, or the target maximum rotational speed ntm is set to a value which is lower than a normal value in order to secure a certain level of safety. The ineffective time tista changes according to the viscosity of the operating oil, that is, the temperature of the oil. In accordance with the change in the ineffective time, the virtual maximum rotational speed gntista changes. Therefore, it is preferable that the reference shift point nochg and the learning correction value gwotno be set using the oil temperature or the like as a parameter.

In step S9, it is determined whether the virtual maximum rotational speed gntista is in a learning dead zone where the learning of the fully open time shift point nomchg does not need to be performed, by determining whether the virtual maximum rotational speed gntista is in a range of an upper limit rotational speed gntlrnh to a lower limit rotational speed gntlrnl. The upper limit rotational speed gntlrnh is set to a value above the target maximum rotational speed ntm, and a lower limit rotational speed gntlrnl is set to a value below the target maximum rotational speed ntm. When it is determined that the virtual maximum rotational speed gntista is in the learning dead zone, the learning control is cancelled, and the routine ends. Due to this operation, hunting (slight up-and-down fluctuation) at the fully open time shift point due to a slight difference between the virtual maximum rotational speed gntista and the target maximum rotational speed ntm can be prevented.

When a negative determination is made in step S9, that is, when the virtual maximum rotational speed gntista is not in the learning dead zone, step S10 is performed. Then, it is determined whether the maximum value of the actual turbine rotational speed NT during shifting, that is, the turbine rotational speed ntmax at the inertia phase start time (time t2) is equal to or higher than a predetermined guard rotational speed gntgd for preventing overrun. The guard rotational speed gntgd is for preventing the engine 10 from overrunning. The guard rotational speed gnrgd is set to a rotational speed which is slightly lower than a fuel cut rotational region in which the operation of the engine 10 is forcibly stopped. When it is determined that the turbine rotational speed ntmax is lower than the guard rotational speed gntgd, step S12 is performed immediately, and a correction amount gdno is calculated according to the following equation (2) based on the deviation (ntm-gntista) between the target maximum rotational speed ntm and the virtual maximum rotational speed gntista using the predetermined coefficient. When it is determined that the turbine rotational speed ntmax is equal to or higher than the guard rotational speed gntgd, in order to decrease the fully open time shift point nomchg promptly such that the turbine rotational speed ntmax does not exceed the guard rotational speed gntgd during next upshifting at high acceleration, the coefficient in the equation (2) is made higher than the normal coefficient in step S11. Then, in step S12, the correction amount gdno is calculated using the coefficient. Since the fully open time shift point nomchg is related to the output rotational speed $N_{OUT}$, the deviation on the input side (ntm-gntista) is divided by the gear ratio γ of the shift speed before upshifting.

$$gdno = \text{coefficient} \times (ntm \times gntista)/\gamma \quad (2)$$

In step S13, a guard process for limiting the correction amount gdno within the predetermined range is performed. In step S14, a new learning correction amount gwotno is calculated by adding the correction amount gdno to the present learning correction amount gwotno. In step S15, a guard process for limiting the learning correction value gwotno within the predetermined range is performed. In step S16, the learning correction value gwotno stored in the storage device such as the RAM is updated to the new value.

Figure 10:
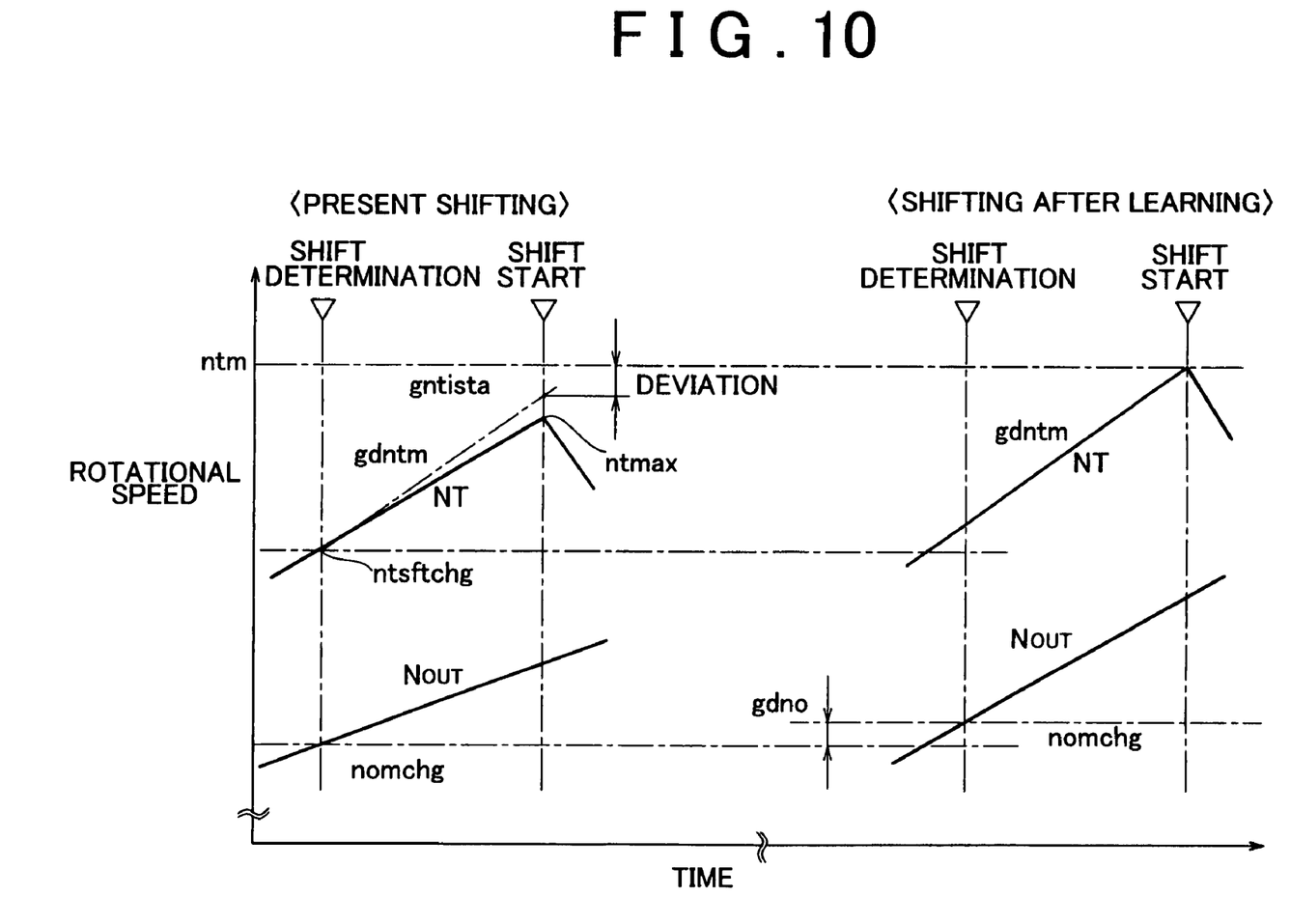
FIG. 10 is an example of a time chart for describing a change in a rotational speed during upshifting before and after a fully open time shift point nomchg is corrected according to the flowchart in FIG. 8.

By repeatedly performing correction (change) of the fully open time shift point nomchg using the high acceleration time upshifting device 112, the fully open time shift point nomchg converges on a substantially constant value such that the virtual maximum rotational speed gntista is substantially equal to the target maximum rotational speed ntm, regardless of the variation of the ineffective time tista due to the individual difference in the hardware such as the clutches C and the brakes B. As shown in FIG. 10, when the virtual maximum rotational speed gntista is lower than the target maximum rotational speed ntm during present upshifting at high acceleration, the learning correction value gwotno and also the fully open time shift point nomchg are increased only by the correction amount gdno according to the deviation (ntm-gntista). Thus, during upshifting at high acceleration after the learning, the virtual maximum rotational speed gntista is substantially equal to the target maximum rotational speed ntm. Also, the fully open time shift point nomchg is corrected based on the predetermined reference rotational speed change rate gdntm. Accordingly, even when the change rate of the actual turbine rotational speed NT or the maximum value ntmax changes due to disturbances such as the inclination of the road, there is no effect on the learning correction value gwotno of the fully open time shift point nomchg. Also, the learning correction value gwotno and the fully open time shift point nomchg are stabilized. In the running condition substantially the same as the running condition when the reference rotational speed change rate gdntm is set, for example, when the vehicle running on a flatland is highly accelerated, the turbine rotational speed NT is changed at a change rate substantially the same as the reference rotational speed change rate gdntm, as shown in a shift time after learning in FIG. 10, and shifting is performed at a rotational speed substantially equal to the target maximum rotational speed ntm.

As described so far, the high acceleration time upshifting device 112 according to the embodiment obtains the virtual maximum rotational speed gntista, which is the maximum rotational speed when the turbine rotational speed NT changes at the reference rotational speed change rate gdntm, using the turbine rotational speed ntsftchg when the upshift command is output, the ineffective time tista, and the predetermined reference rotational speed change rate gdntm. The high acceleration time upshifting device 112 then corrects the fully open time shift point nomchg such that the virtual maximum rotational speed gntista comes close to the target maximum rotational speed ntm. Therefore, by setting the reference rotational speed change rate gdntm in consideration of the change in the change rate of the turbine rotational speed NT due to the torque phase or the like after the upshift command is output, it is possible to perform shifting at a rotational speed substantially equal to the target maximum rotational speed ntm with higher accuracy.

Also, after the actual ineffective time tista is obtained, the virtual maximum rotational speed gatista is calculated, and the fully open time shift point nomchg is corrected. Therefore, the fully open time shift point nomchg converges on the substantially constant value according to the individual difference in the hardware of the automatic transmission 14, such as the clutches C1 and the brakes B1 that affect the ineffective time tista. As long as the turbine rotational speed NT changes at the change rate substantially the same as the predetermined reference rotational speed change rate gdntm, it is possible to stably perform shifting at a speed substantially equal to the target maximum rotational speed ntm regardless of the individual difference in the hardware of the automatic transmission 14.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A high acceleration time shift control apparatus for a vehicle, comprising:
   a transmission which achieves plural shift speeds whose gear ratios are different from each other; and
   a high acceleration time upshifting control device which changes a shift speed of the transmission to a higher speed based on a predetermined determination rotational speed such that an input rotational speed of the transmission substantially reaches a target maximum rotational speed when a request for high acceleration is made by a driver, wherein the high acceleration time upshifting control device outputs an upshift command for performing an upshift when the determination rotational speed reaches a predetermined shift determination speed; calculates an actual ineffective time until shifting is actually started and the input rotational speed starts decreasing after the upshift command is output; computes a virtual maximum rotational speed, that is a maximum rotational speed when the input rotational speed changes at a reference rotational speed change rate, based on the input rotational speed when the upshift command is output, the ineffective time and the predetermined reference rotational speed change rate; and changes the shift determination speed such that the virtual maximum rotational speed comes close to the target maximum rotational speed and then performs learning.

2. The high acceleration time shift control apparatus for a vehicle according to claim 1, wherein the reference rotational speed change rate is decided for each type of upshifting.

3. The high acceleration time shift control apparatus for a vehicle according to claim 1, wherein the high acceleration time upshifting control device calculates a correction value based on a difference between the target maximum rotational speed and the virtual maximum rotational speed, and changes the shift determination speed based on the correction value and then performs learning.

4. The high acceleration time shift control apparatus for a vehicle according to claim 3, wherein, when a maximum value of the actual input rotational speed during shifting is equal to or higher than a predetermined value, the high acceleration time upshifting control device makes effect of the correction value on the shift determination speed large compared with a case where the maximum value of the actual input rotational speed during shifting is lower than the predetermined value.

5. A high acceleration time shift control apparatus for a vehicle, comprising:
   a transmission which achieves plural shift speeds whose gear ratios are different from each other; and
   high acceleration time upshifting means for changing a shift speed of the transmission to a higher speed based on a predetermined determination rotational speed such that an input rotational speed of the transmission substantially reaches a target maximum rotational speed when a request for high acceleration is made by a driver, wherein the high acceleration time upshifting means, comprises:
   shift determination means for outputting an upshift command for performing an upshift when the determination rotational speed reaches the predetermined shift determination speed;
   ineffective time calculating means for calculating an actual ineffective time until shifting is actually started and the input rotational speed starts decreasing after the upshift command is output;
   virtual maximum rotational speed computing means for computing a virtual maximum rotational speed, that is a maximum rotational speed when the input rotational speed changes at a reference rotational speed change rate, based on the input rotational speed when the upshift command is output, the ineffective time and the predetermined reference rotational speed change rate; and
   learning means for changing the shift determination speed such that the virtual maximum rotational speed comes close to the target maximum rotational speed.

6. The high acceleration time shift control apparatus for a vehicle according to claim 5, wherein the reference rotational speed change rate is decided for each type of upshifting.

7. The high acceleration time shift control apparatus for a vehicle according to claim 5, wherein the learning means calculates a correction value based on a difference between the target maximum rotational speed and the virtual maximum rotational speed, and changes the shift determination speed based on the correction value and then performs learning.

8. The high acceleration time upshifting control device according to claim 7, wherein when a maximum value of the actual input rotational speed during shifting is equal to or higher than a predetermined value, the learning means makes effect of the correction value on the shift determination speed large compared with a case where the maximum value of the actual input rotational speed during shifting is lower than the predetermined value.

9. A high acceleration time shift control method for a vehicle comprising a transmission that achieves plural shift speeds whose gear ratios are different from each other, comprising the steps of:
   changing a shift speed of the transmission to a higher speed based on a predetermined determination rotational speed such that an input rotational speed of the transmission substantially reaches a target maximum rotational speed when a request for high acceleration is made by a driver;
   outputting an upshift command for upshifting when the determination rotational speed reaches a predetermined shift determination speed;
   calculating an actual ineffective time until shifting is actually started and the input rotational speed starts decreasing after the upshift command is output;
   computing a virtual maximum rotational speed, that is a maximum rotational speed when the input rotational speed changes at a reference rotational speed change rate, based on an input rotational speed when the upshift command is output, the ineffective time, and the predetermined reference rotational speed change rate; and
   changing the shift determination speed such that the virtual maximum rotational speed comes close to the target maximum rotational speed and then performing learning.

10. The high acceleration time shift control method for a vehicle according to claim 9, wherein the reference rotational speed change rate is decided for each type of upshifting.

11. The high acceleration time shift control method for a vehicle according to claim 9, further comprising the step of:
calculating a correction value based on a difference between the target maximum rotational speed and the virtual maximum rotational speed and changing the shift determination speed based on the correction value and then performing learning.

12. The high acceleration time shift control method for a vehicle according to claim 11, wherein, when a maximum value of the actual input rotational speed during shifting is equal to or higher than a predetermined value, effect of the correction value on the shift determination speed is made large compared with a case where the maximum value of the actual input rotational speed during shifting is lower than the predetermined value.

* * * * *